United States Patent
Fan et al.

(10) Patent No.: US 10,419,260 B2
(45) Date of Patent: Sep. 17, 2019

(54) SYSTEM AND METHOD FOR ROBUST OFDM SYNCHRONIZATION

(71) Applicant: Hughes Network Systems, LLC, Germantown, MD (US)

(72) Inventors: Donglei Fan, College Park, MD (US); Bassel Beidas, Alexandria, VA (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 15/723,130

(22) Filed: Oct. 2, 2017

(65) Prior Publication Data
US 2019/0104009 A1 Apr. 4, 2019

(51) Int. Cl.
*H04L 27/26* (2006.01)

(52) U.S. Cl.
CPC ...... *H04L 27/2663* (2013.01); *H04L 27/2613* (2013.01); *H04L 27/2678* (2013.01); *H04L 27/2688* (2013.01); *H04L 27/2657* (2013.01); *H04L 27/2671* (2013.01); *H04L 27/2675* (2013.01); *H04L 27/2682* (2013.01); *H04L 27/2692* (2013.01)

(58) Field of Classification Search
CPC ............. H04L 27/2663; H04L 27/2678; H04L 27/2688; H04L 27/2671
See application file for complete search history.

(56) References Cited

U.S. PATENT DOCUMENTS

| | | | | |
|---|---|---|---|---|
| 2003/0072256 | A1* | 4/2003 | Kim | H04L 27/2613 370/208 |
| 2007/0195914 | A1* | 8/2007 | Chang | H04L 27/2662 375/343 |
| 2009/0252026 | A1* | 10/2009 | Yousef | H04L 27/2656 370/210 |
| 2012/0027148 | A1* | 2/2012 | Sgraja | G10L 19/0019 375/359 |
| 2016/0218856 | A1* | 7/2016 | Adhikary | H04L 7/0037 |
| 2019/0013892 | A1* | 1/2019 | Chen | H04K 3/228 |

OTHER PUBLICATIONS

T.M. Schmidl and D.C. Cox, "Robust Frequency and Timing Synchronization for OFDM," IEEE Trans. on Communications, vol. 45, pp. 1613-1621, Dec. 1997.

(Continued)

*Primary Examiner* — Freshteh N Aghdam
(74) *Attorney, Agent, or Firm* — NovoTechIP International PLLC

(57) ABSTRACT

Disclosed methods include transmitting an OFDM signal including a succession of frames spaced apart by a set of training symbols that are symmetric in time and each formed by a plurality of even-frequency sub-carriers, spaced by odd frequency zeros. The OFDM signal is received and sampled and timing metrics are determined. Local maximums, or peaks of the timing metrics are detected, and from the peaks a coarse time offset is determined. A correlation metric, at sample indexes within a region determined by the coarse time offset, is applied and, based on a peak, an estimated time offset is generated. A correlation metric of the estimated time offset is determined and, based on the correlation metric, an estimated frequency offset is generated.

15 Claims, 8 Drawing Sheets

(56) References Cited

OTHER PUBLICATIONS

Nasraoui et al: "An Efficient Reduced-Complexity Two-Stage Differential Sliding Correlation Approach for OFDM Synchronization in the AWGN Channel". Vehicular Technology Conference (VTC FALL), 2011 IEEE, IEEE, Sep. 5, 2011 (Sep. 5, 2011), pp. 1-5.
Awoseyila et al: "Robust time-domain timing and frequency synchronization for OFDM systems", IEEE Transactions on Consumer Electronics, IEEE Service Center, New York, NY, US, vol. 52, No. 2, May 1, 2009 (May 1, 2009), pp. 391-399.
Abdzadeh-Ziabari et al: "A new timing synchronization approach for OFDM systems", Ultra Modern Telecommunications and Control Systems and Workshops (ICUMT), 2011 3rd International Congress on, IEEE, Oct. 5, 2011 (Oct. 5, 2011), pp. 1-4.
Liu et al: "Joint Frame Synchronization and Frequency Offset Estimationin OFDM Systems", IEEE Transactions on Broadcasting, IEEE Service Center, Piscataway, NJ, US, vol. 51, No. 3, Sep. 1, 2005 (Sep. 1, 2005), pp. 389-394.
Park et al: "A simple preamble for ofdm timing offset estimation", VTC 2002-FALL. 2002 IEEE 56th. Vehicular Technology Conference Proceedings. Vancouver, Canada, Sep. 24-28, 2002; [IEEE Vehicular Technology Conference], New York, NY : IEEE, US, vol. 2, Sep. 24, 2002 (Sep. 24, 2002), pp. 729-732.
Schmidl et al: "Robust Frequency and Timing Synchronization for OFDM", Dec. 1, 1998, vol. 45, No. 12, Dec. 1, 1997 (Dec. 1, 1997), pp. 1613-1621.
International Search Report and Written Opinion dated Jan. 7, 2019 by the International Searching Authority (European Patent Office) in PCT Application PCT/US2018/052838.

\* cited by examiner

SYSTEM AND METHOD FOR ROBUST OFDM SYNCHRONIZATION

BACKGROUND

Orthogonal Frequency Division Multiplexing (OFDM) is included in various terrestrial standards, for example, long-term evolution (LTE) fourth generation (4G), and in certain wireless local area network (WLAN) protocols. OFDM generally requires the OFDM receiver to accurately and stably synchronize to OFDM signals that arrive at the receiver antenna(s). Synchronization error can induce loss of orthogonality among the OFDM subcarriers, resulting in degradation beyond what would be experienced by traditional systems. In addition, satellite systems can employ powerful low density parity check (LDPC) coding, requiring receivers to operate at low levels of signal-to-noise ratio (SNR), which can further complicate the synchronization task.

One synchronization technique, commonly referred to as the "Schmidl and Cox" technique (See, T. M. Schmidl and D. C. Cox, "Robust Frequency and Timing Synchronization for OFDM," IEEE Trans. on Communications, Vol. 45, pp. 1613-21, December 1997), provides timing and frequency synchronization by sending two OFDM training symbols, the first containing identical halves. This technique, however, has technical shortcomings. For example, the second OFDM training symbol provides for estimation of only the even integer part of the frequency offset. This limits the accuracy of offset estimation that can be obtained from the training symbols, and also necessitates additional computation. Another technical shortcoming of the Schmidl and Cox is a requirement of high SNR, due to its differential operation.

Another technique for OFDM timing and frequency synchronization, is a closed-loop method using a feedback loop that includes a post Fast Fourier Transform (FFT) estimation. The closed loop, though, can induce instability in some applications.

SUMMARY

This Summary identifies example features and aspects, and is not an exclusive or exhaustive description of the disclosed subject matter. Whether features or aspects are included in, or omitted from this Summary is not intended as indicative of relative importance of such features. Additional features and aspects are described, and others will become apparent to persons skilled in the art upon reading the following detailed description and viewing the drawings that form a part thereof.

An example disclosed system for synchronizing a receiving of an orthogonal frequency division multiplexing (OFDM) can include an input data interface configured to receive a sequence signal samples and associated indexes, a processing unit; and a memory configured to a store a plurality of instructions that when read and executed by the processing unit can cause the processing unit to detect a timing metric at each of a succession of the indexes and determine, as a first peak, an index at which the timing metric is at a local maximum, and can cause the processing unit to detect the timing metric at indexes within a first region of the indexes and determine, as a second peak, an index at which the timing metric is at another local maximum, the first region being based in part on the first peak, select a coarse offset as the smaller of the first peak and the second peak, detect a correlation metric at each of a plurality of indexes within a second region of the indexes, the second region being based at least in part on the coarse offset, generate, as an estimated time offset, an index at which the detected correlation metric is at a local maximum, and apply a timing correction, or a frequency correction, or both, to a recovery of symbols from the signal samples, which can be based at least in part on the estimated time offset.

An example disclosed method for communicating a robust synchronization OFDM frame can include generating an OFDM symbol frame; adding a training symbol prefix to the OFDM symbol frame, the training symbol prefix including a plurality of training symbols, each of the training symbols including N sub-symbol fields. A first N/2 of the sub-symbol fields can be set at a zero value, a second of the N/2 sub-symbol fields can carry corresponding symbols of a N/2 sub-symbol pseudo random training symbol, and a first half of the pseudo random training symbol can be symmetrical to a second half of the pseudo random training symbol. An example implementation can include transmitting the training symbol prefix as a multi-carrier transmission within an OFDM N-sub-carrier transmission, and the multi-carrier prefix transmission can signal power on a first N/2 of the N sub-carriers and can suppress signal power on a second N/2 of the sub-carriers, and the first N/2 sub-carriers and the second N/2 sub-carriers can be aligned at alternating positions in the frequency domain.

An example disclosed method for synchronizing a receiving of an OFDM communication can include receiving a sequence of signal samples and associated indexes; detecting a timing metric at each of a succession of the indexes and determining, as a first peak, an index at which the timing metric is at a local maximum; and can include detecting the timing metric at indexes within a first region of the indexes and determining, as a second peak, an index at which the timing metric is at another local maximum, the first region being based in part on the first peak; selecting a coarse offset as the smaller of the first peak and the second peak; detecting a correlation metric at a plurality of indexes within a second region of the indexes, the second region being based at least in part on the coarse offset; determining, as an estimated time offset, an index at which the correlation metric is a local maximum; and applying a timing correction, or a frequency correction, or both, to a recovery of symbols from the signal samples, based at least in part on the estimated time offset.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, to avoid unnecessarily obscuring aspects of the present teachings.

Figure 1:
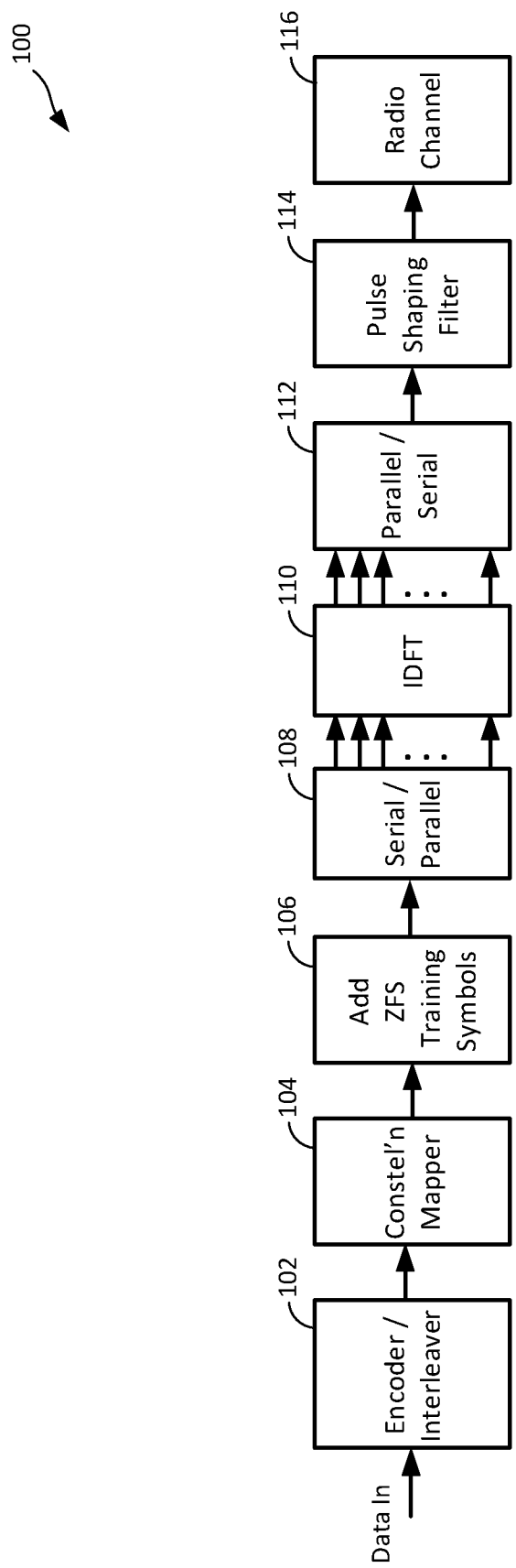
FIG. 1 illustrates a functional block diagram of one example zeroed odd frequency training symbol (ZFS) orthogonal frequency division multiplexing (OFDM) transmission system.

FIG. 1 illustrates a functional block diagram of one example zeroed odd frequency training symbol (ZFS) orthogonal frequency division multiplexing (OFDM) transmission system 100, according to one or more aspects. It will be understood that the abbreviation "ZFS," as used herein, is a coined abbreviation carrying no meaning other than: "zeroed odd frequency training symbol." The system 100 is configured to transmit an N-sub-carrier OFDM signal, including N sub-carriers that are mutually orthogonal, with each sub-carrier modulated to carry a series of sub-symbols, that in combination can form a series of N-OFDM symbols, one from each of the sub-carriers. The system 100 can be configured to format the OFDM signal as frames, each including M OFDM symbols, and to insert ZFS training symbols between the frames. In an aspect, an ZFS robust synchronization OFDM receiver system, described in greater detail in later sections, can apply particular processes that can rapidly estimate timing and frequency offset at the receiver, through particular utilizations of features of the ZFS training symbols.

Referring again to FIG. 1, the ZFS OFDM transmission system 100 can include an encoder and interleaver 102, configured to receive an input information signal stream, SP, and output a suitably encoded and interleaved information stream, LP, to a constellation mapper 102. The particular operations of the encoder and interleaver 102 can be according to techniques not necessarily specific to the disclosed systems and methods, and therefore further detailed description of such techniques is omitted.

The constellation mapper 104 can map the information symbols to an M-ary signal space in which the symbols are, for example, X-Y positions in a complex plane, with "X" being an in-phase component and "Y" being a "j" or quadrature component. The particular operations performed in the mapping can be according to techniques not necessarily specific to the disclosed systems and methods, and therefore further detailed description of such techniques is omitted. For purposes of avoiding unnecessary description not relevant to disclosed concepts, the constellation mapper 104 will be assumed as configured for a four-state QAM signal space of C+Dj, where C can be +1 or −1, and D can be +1 or −1, or scaled versions thereof. This is only an example, though, and is not intended as a statement of preference or to be any limitation on the range of implementations according to this disclosure.

The ZFS training symbol insertion unit 106 can be configured to insert the ZFS training symbols between OFDM successive frames. The ZFS training symbols can include a first ZFS training symbol and a second ZFS training symbol in immediate succession, i.e., as two OFDM symbol slots, between successive frames. The ZFS training symbol insertion unit 106 can be implemented, for example, using storage registers (not visible in FIG. 1), or locations in a memory resource of a general purpose programmable computer (not visible in FIG. 1), or other programmable processing engine (not visible in FIG. 1). Another implementation of the ZFS training symbol insertion unit 106 can provide or support a process for generating the ZFS training symbols. For example, the ZFS training symbol can be generated by performing an inverse Fast Fourier Transform (IFFT) of one-half size and then repeating its output in the time domain.

The serial/parallel unit 108 can be configured to feed successive OFDM symbols, including ZFS training symbols followed by frame symbols, as successive blocks of N QAM coded sub-symbols into an N-point inverse Discrete Fourier Transform (IDFT) unit 110. The N-point IDFT unit 110 can generate, for each sub-symbol, a time domain sample of a corresponding one of N sub-carriers, each effectively modulated in amplitude and phase, to one of four amplitude-phase positions, by the values of C and D. The N-point IDFT unit 110 can be implemented, for example, as an N-point IFFT device. Particular operations performed by the N-point IDFT unit 110, whether implemented as an IFFT or otherwise, can be according to techniques not necessarily specific to the disclosed systems and methods, and therefore further detailed description of such techniques is omitted.

Referring again to FIG. 1, the ZFS OFDM transmission system 100 can also include a parallel to serial unit 112 that can re-form the parallel N time domain outputs of the IFFT unit 110 into a serial block or window of N sub-symbol time samples. The serial block of N sub-symbol time samples can be input to a pulse shaping filter 114, the output of which can be transmitted over a radio channel 116. The radio channel 116 can include a radio frequency (RF) upconverter (not visible in FIG. 1) that can frequency shift the filtered N sub-symbols to an RF band for radio transmission from a transmission antenna (not visible in FIG. 1). The specific frequency(ies) can be application specific. The radio channel 116 can also include a propagation path (not visible in FIG. 1) from the transmission antenna to a ZFS robust synchronization receiver (not visible in FIG. 1) that can be according to one or more systems and methods for ZFS robust synchronization receiving disclosed herein.

As described above, the ZFS training symbol insertion unit 106 can be configured to insert ZFS training symbols between OFDM information frames. Referring to Table I below, various features and aspects of the ZFS training symbols will be described. These features and aspects, in combination with particular receiver processes described in greater detail later, can provide rapid and accurate estimation of timing offset and frequency offset at the receiver, at signal-to-noise-ratios (SNRs) that can be lower than SNRs at which conventional offset estimation techniques can provide acceptable operation. The ZFS training symbols shown in Table 1 are examples, for purposes of illustrating certain concepts and various aspects thereof, and are not intended as any limitation on the scope of practices or implementations according to such concepts and aspects.

TABLE 1

| Subcarrier Index k | $C_{1,v}$ | $C_{2,v}$ |
|---|---|---|
| 0 | 1 + 1j | 1 − 1j |
| 1 | 0 | 0 |
| 2 | −1 + 1j | 1 + 1j |
| 3 | 0 | 0 |
| . | . | . |
| . | . | . |
| . | . | . |
| N − 2 | 1 + 1j | 1 − 1j |
| N − 1 | 0 | 0 |

Referring to Table 1, each of the N rows corresponds to a "k" sub-carrier index that ranges, in single step increments, from "0" up to N−1, "N" being an integer. For purposes of this description, sub-carriers at k=0, 2, 4 . . . , N−2, can be referred to as "even sub-carriers" or "even frequencies," and sub-carriers at k=1, 3, 5 . . . , N−1, can be referred to as "odd sub-carriers" or "odd frequencies." It will be understood that the naming convention as which of the sets of N/2 sub-carriers is "even" and which is "odd" labels "even" and "odd" is arbitrary. As illustrated in Table 1, ZFS training symbols can include N/2 sub-symbols interleaved with zeroes. The N/2 sub-symbols are configured to form each ZFS training symbols as a pseudorandom number, as described in greater detail later. Depending on whether the alternating zeros begin at the first sub-carrier (k=0) or the second sub-carrier (k=1), and depending on the even-odd naming convention used, OFDM transmission of ZFS training symbols sets either the even sub-carriers or the odd sub-carriers at zero. For brevity, the remainder of this description arbitrarily configures the zero pattern in the manner illustrated in Table 1 which, using the described even-odd naming scheme, sets the odd sub-carriers at zero. It will be understood that disclosed systems and methods can be alternatively implemented with ZFS training symbol configurations that set the even sub-carriers at zero.

Referring again to Table 1, the example ZFS training symbols include a first ZFS training symbol, C1,v and a second ZFS training symbol C2,v. The index "v" is a frame index, corresponding to the OFDM information frame that immediately follows the C1,v and C2,v.

The Table 1 first ZFS training symbol C1,v and the second ZFS training symbol C2,v each contain a pseudorandom (PN) sequence of sub-symbols at row positions corresponding to even sub-carriers and contain zeroes at row positions corresponding to odd sub-carriers. The Table 1 example PN sequence carried by the first ZFS training symbol C1,v is: +1+1j; −1+1j, . . . +1+1j, and the example PN sequence carried by the second ZFS training symbol C2,v is: +1−1j; 1+1j, . . . +1−1j. In an aspect, the first ZFS training symbol C1,v, and each of the successive first second ZFS training symbols, e.g., C1,v+1; C1,v+2, . . . (not visible in Table 1) have a symmetry in which the sub-sequence of N/2 sub-symbols (of which N/4 are zero) forming the first half of the PN sequence is identical to the N/2 sub-symbols (of which N/4 are zero) forming the second half of the PN sequence. ZFS time offset and frequency offset estimation techniques applied at ZFS receivers described in greater later, can exploit this symmetry of the two ZFS training symbols.

Figure 2:
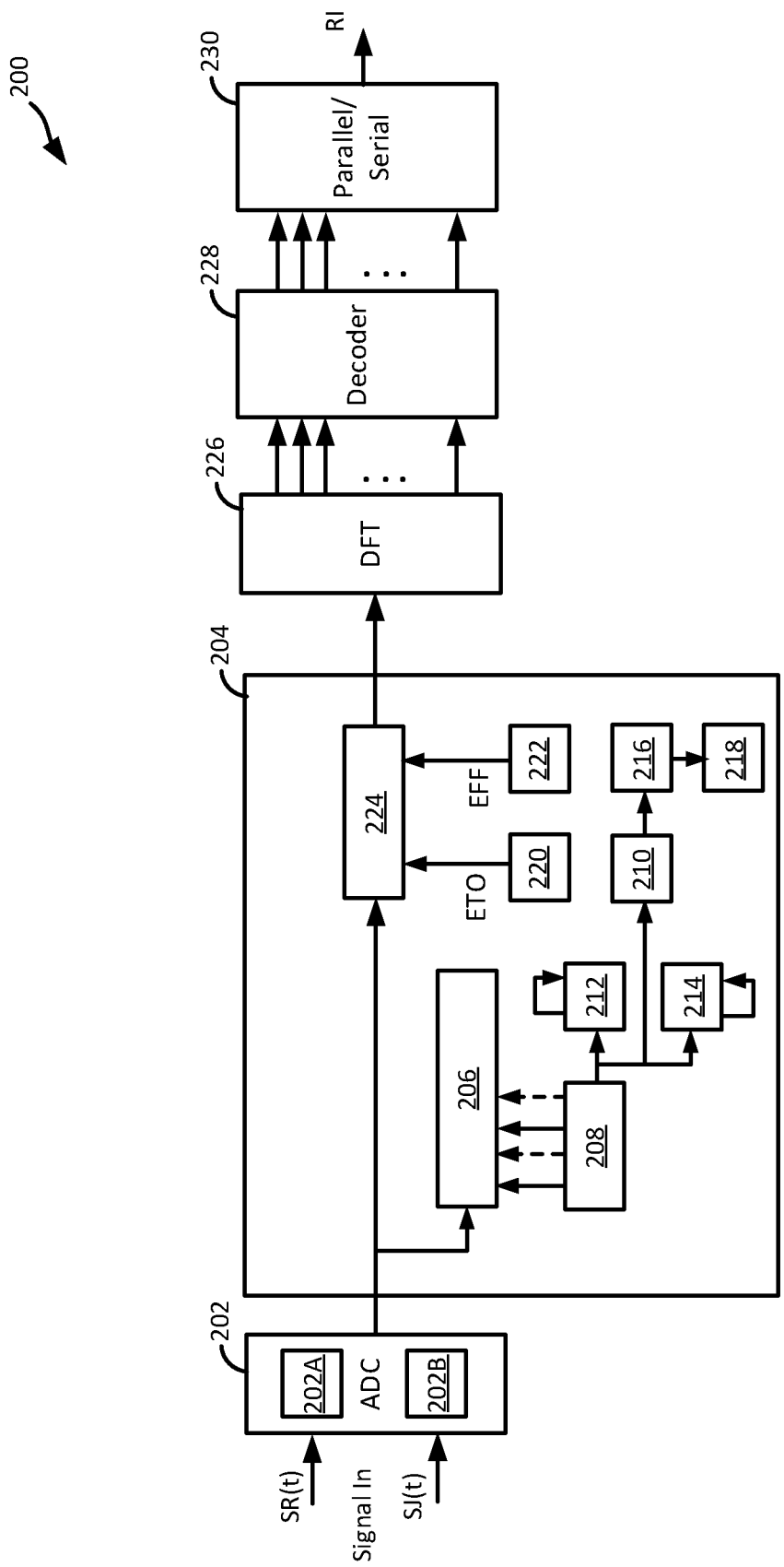
FIG. 2 illustrates a functional block diagram of one example ZFS robust synchronization OFDM receiver system.

FIG. 2 shows a functional block diagram of one example ZFS/robust synchronization OFDM receiver system 200, (hereinafter "system 200"). The system 200 can include an analog-to-digital converter (ADC) 202 formed, for example, of an in-phase ADC 202A for sampling an in-phase Signal In, labeled SR(t), and a quadrature in-phase ADC 202B, labeled SJ(t), for sampling a quadrature Signal In. SR(t) and SJ(t) can be provided, for example, by an in-phase downconverter and a quadrature downconverter of an RF receiver (not visible in FIG. 2).

ADC 202A and 202B respectively output OFDM signal samples SR(d) and SJ(d), collectively "S(d)." The signal samples S(d) can be input to the ZFS OFDM robust synchronization logic 204. As described above in reference to FIG. 1, ZFS training symbols are inserted between frames. The illustrated ZFS OFDM robust synchronization unit 204 is configured to estimate time offset and frequency offset of the system 200 based on the ZFS training symbols and, to apply particular offset correction processes as will be described in greater detail. The ZFS OFDM robust synchronization unit 204 can include a correlation buffer 206, configured to receive a stream of samples S(d) and store, for later cross-correlation and auto-correlation operations, a succession of approximately 2N of the samples. It will be understood that the term "buffer," as used herein in the context "of correlation buffer" 206, means a logic function for which implementation is not limited to any particular hardware or software configuration or architecture. One implementation of the correlation buffer 206 can include an array of registers (not separately visible in FIG. 2), arranged in series—for a serial-in-serial-out clocking of the S(d) samples—in addition to being individually addressable. The correlation buffer 206 can be configured with particular accessibility for enabling cross-correlation calculations, e.g., capability of fast access to pairs of samples S(d) in the correlation buffer 206, spaced apart by cross-correlation delays, as will be described in greater detail.

The ZFS OFDM robust synchronization logic 204 can further include a correlation engine 208, configured with capability of computing particular autocorrelations and cross-correlations of S(d) in the correlation buffer 206, over given ranges of "d." The ZFS OFDM robust synchronization logic 204 can provide the correlation engine 208 with access capability, as illustrated by arrows in FIG. 2, to samples S(d) in the correlation buffer 206 when performing cross-correlation and autocorrelation computations. The ZFS OFDM robust synchronization logic 204 can also include a timing and correlation metric engine 210, configured with capability of computing particular metrics, based on autocorrelation data and cross-correlation data generated by the correlation engine 208.

It will be understood that "engine," as used herein in the context of "correlation engine" 208 and "timing and correlation metric engine" 210, means a computation capability, and is not limited to any particular hardware or software architecture, or combination thereof. For example, one implementation of the ZFS OFDM robust synchronization logic 204 can include an arithmetic logic unit (ALU) (not separately visible in FIG. 2), an associated computation controller (not separately visible in FIG. 2), providing computational resources sufficient to perform according to the correlation engine 208 and the timing and correlation metric engine 210.

In an aspect, the correlation engine 208 and the timing and correlation metric engine 210 can be configured with capability to perform computations of a particular timing metric, M(d), according to the following Equations (1)-(3):

$$M(d) = \frac{|P(d)|^2}{(R(d))^2} \qquad \text{Equation (1)}$$

$$P(d) = \sum_{m=0}^{\frac{N}{2}-1} \gamma^*_{d+m} \gamma_{d+m+N/2}, \qquad \text{Equation (2)}$$

$$R(d) = \sum_{m=0}^{\frac{N}{2}-1} |\gamma_{d+m+N/2}|^2 \qquad \text{Equation (3)}$$

where, m is a cross-correlation and autocorrelation index,

N/2 is one-half the length of the ZFS training samples, $\gamma_x$ is a signal sample at index position x, e.g., S(d+m+N/2), and $\gamma_x^*$ is a conjugate of the signal sample at index position x.

Configurations to perform computations according to Equations (1)-(3) can include configuring correlation engine 208 to compute P(d) and R(d), for each index d in the range defined above, in accordance with Equations (2)-(3), and provide the resulting P(d) and R(d) to the correlation and timing metric engine 210. The timing and correlation metric engine 210 can be configured to compute, in turn, the magnitude squared of P(d), and the magnitude squared of R(d), compute the ratio of the two magnitudes squared, and output a corresponding M(d).

In an aspect, the correlation engine 208 and the timing and correlation metric engine 210 can be configured to accumulate correlation data over multiple frames, and to generate M(d) as an accumulated M(d). For example, in one implementation, the correlation engine 208 and the timing and correlation metric engine 210 can be configured to compute a coherent accumulated timing metric, $M_{coh}^{NF}(d)$, over NF frames, as illustrated by the following Equation (4), where "coherent" means phase information is carried in the accumulation:

$$M_{coh}^{NF}(d) = \frac{\left|\sum_{i=1}^{NF} P^{(i)}(d)\right|^2}{\left(\sum_{i=1}^{NF} R^{(i)}(d)\right)^2} \qquad \text{Equation (4)}$$

where $M_{coh}^{NF}(d)$ is the accumulated timing metric, over NF frames, $P_d^{(i)}$ is the Equation (2) cross-correlation metric, at the ith frame, and $R_d^{(i)}$ is the Equation (3) autocorrelation metric, at the ith frame.

In another implementation, the correlation engine 208 and the timing and correlation metric engine 210 can be configured to compute non-coherent accumulated timing metric, $M_{non}^{NF}(d)$, over NF frames, as illustrated by the following Equation (5), where "non-coherent" means phase information is not carried in the accumulation:

$$M_{non}^{NF}(d) = \frac{\sum_{i=1}^{NF} |P^{(i)}(d)|^2}{\sum_{i=1}^{NF} (R^{(i)}(d))^2} \qquad \text{Equation (5)}$$

Technical features of coherent and non-coherent combining of synchronization parameters, for example, as defined by Equations (4)-(5), can include improved synchronization performance at lower levels of SNR, through accumulation of useful correlation contributions from multiple frames. Coherent accumulation combines both amplitude and phase information of the individual components. Non-coherent accumulation, in contrast, uses only amplitude information of the individual components. Non-coherent accumulation can be more robust to fast varying channel conditions, but coherent accumulation can provide better performance, subject to channel variation rate constraints. Both coherent and non-coherent accumulation, though, can provide improvement over correlation based on single-frame computation.

Referring to the FIG. 2 ZFS OFDM synchronization logic 204, for computations according to Equation (4), Equation (5), or both, a cross-correlation accumulator 212 can be provided, configured to accumulate $P_d^i$, for a given (d), over NF frames, and an autocorrelation accumulator 214 can be provided, configured to accumulate $R_d^i$, for a given (d), over NF frames. Their respective outputs can be provided to the correlation and timing metric engine 210. In one example implementation, the cross-correlation accumulator 212 and autocorrelation accumulator 214 can be integrated into the correlation engine 208. In another example implementation, the cross-correlation accumulator 212 and autocorrelation accumulator 214 can be integrated into the timing and correlation metric engine 210. In another implementation, the cross-correlation accumulator 212, or the autocorrelation accumulator 214, or both, can be performed, in whole or in part, by computation and memory resources of a shared programmable processor.

In one implementation, ZFS OFDM synchronization logic 204 can include a peak detection buffer 216 and associated peak detection logic 218. The peak detection buffer 216 can be configured to hold a plurality, e.g., a window, of timing metric values, e.g., a plurality of M(d) computations output by the timing and correlation metric engine 210. The peak detection logic 218 can be configured to detect local peaks among the plurality held in the buffer 216. In one implementation, the peak detection buffer 216, or the associated peak detection logic 218, or both, can be incorporated into the timing and correlation metric logic 210. In another implementation, described functionality of the peak detection buffer 216, or the associated peak detection logic 218, or both, can be provided, in whole or in part, by computation and memory resources of a shared programmable processor.

In an aspect, the ZFS OFDM synchronization logic 204 can include an estimated time offset (ETO) engine 220, configured to generate ETO based on identifying a peak value of a correlation metric, CM, such as the example defined by Equation (6) below, over a range of d that can be set according to the above-described CTO, as follows:

$$CM(d) = (|P(d)|^2 + |P(d+N)|^2)/((R(d))^2 + (R(d+N))^2) \qquad \text{Equation (6)},$$

the range of d being, for example, $$|d - CTO| \le \frac{N}{2}$$

In an implementation, the ETO engine 220 can be configured to generate ETO based on a peak value of a coherent accumulated correlation metric, $CM_{coh}(d)$, such as defined by Equation (7) below:

$$CM_{coh}(d) = \frac{\left|\sum_{i=1}^{NF}(P^{(i)}(d)+P^{(i)}(d+N))\right|^2}{\left(\sum_{i=1}^{NF}(R^{(i)}(d)+R^{(i)}(d+N))\right)^2} \quad \text{Equation (7)}$$

In addition, the ETO engine 220 can be configured to generate ETO based on a peak value of a non-coherent accumulated correlation metric, $CM_{non}(d)$, such as defined by Equation (8) below:

$$CM_{non}(d) = \frac{\sum_{i=1}^{NF}|P^{(i)}(d)+P^{(i)}(d+N)|^2}{\sum_{i=1}^{NF}(R^{(i)}(d)+R^{(i)}(d+N))^2} \quad \text{Equation (8)}$$

In an implementation, the ETO engine 220 can be configured to generate a plurality of CM(d) values according to Equation (6), for example, over the range of d defined above for Equation (6), and to generate ETO as the index d having the peak CM(d) value. Such operations can be according to Equation (9) below:

$$ETO = \text{Max}(CM(d)), \text{ for } |d - CTO| \leq \frac{N}{2} \quad \text{Equation (9)}$$

The ETO engine 220 can be additionally configured to generate a plurality of accumulated $CM_{coh}(d)$ values according to Equation (7), for example, over the same range of d, and then generate ETO as the index d having the peak $CM_{coh}(d)$ value, according to Equation (10) below:

$$ETO = \text{Max}(CM_{coh}(d)), \text{ for } |d - CTO| \leq \frac{N}{2} \quad \text{Equation (10)}$$

The ETO engine 220 can be further or alternatively configured to generate a plurality of $CM_{non}(d)$ values according to Equation (8), for example, over the same range of d, and generate ETO as the index d having the peak $CM_{non}(d)$ value, according to Equation (11) below:

$$ETO = \text{Max}(CM_{non}(d)), \text{ for } |d - CTO| \leq \frac{N}{2} \quad \text{Equation (11)}$$

The ETO engine 220 can also be configured to select between ETO based on coherent multi-frame accumulation, as per Equation (10) and non-coherent multi-frame accumulation, as per Equation (11) based, for example, on SNR conditions.

In an implementation, the ETO engine 220, for one or more of Equations (9)-(11), can be mode of the correlation engine 208 operating in combination with the peak detection buffer 216 and peak detection logic 218. In another implementation, the ETO engine 220 can include duplicate instances of one or more of the correlation engine 208, the peak detection buffer 216 and the peak detection logic 218. In another implementation, the ETO engine 220 can be provided, in whole or in part, by computation resources of a shared programmable processor.

Referring to FIG. 2, the ZFS OFDM synchronization logic 204 can include a frequency offset engine 222 configured to generate an estimated frequency offset (EFF), based at least in part on ETO. In one implementation, the frequency offset engine 222 can be configured to generate EFF according to Equation (12) below:

$$EFF = \text{angle}(P(ETO)+P(ETO+N))/\pi \quad \text{Equation (12)}$$

In addition, the frequency offset engine 222 can be configured to generate an accumulated EFF, for example, a coherent accumulated EFF according to Equation (13) below:

$$EFF_{coh} = \text{angle}(\Sigma_{i=1}^{NF}P^{(i)}(ETO)+\Sigma_{i=1}^{NF}P^{(i)}(ETO+N))/\pi \quad \text{Equation (13)}$$

In an aspect, a time offset value "TO" can be provided, or obtained, through means not necessarily according to Equation (9), whereupon EFF can be generated by operations having a form according to Equation (12), using the provided or obtained time offset TO as opposed to ETO. As another example, a sequence of NF of such time offsets TO can be provided or obtained, for example, one of such TO values per frame, whereupon operations according to Equation (13) can be applied to obtain an accumulated EFF, using the sequence of NF provided or obtained time offsets TO as opposed to a sequence of NF ETOs as described in reference to Equation (9).

The ZFS OFDM synchronization logic 204 can also include an offset correction logic 224 that, based on a single frame ETO or an accumulated ETO, can apply time offset correction to the samples S(d) or, based on a single frame or an accumulated EFF, can apply frequency offset correction to the samples S(d), or can apply both time and frequency offset correction, for input to the N-point DFT 226.

Referring again to FIG. 2, time-offset and frequency offset corrected signal samples can be input to an N-point DFT unit 226 as successive windows of N samples. The N-point DFT unit 226 can be, but is not necessarily, configured as an N-point FFT unit. Each of the N complex-valued frequency domain outputs N of the N-point DFT unit 226 has magnitude and phase information corresponding to the constellation position of a corresponding one of the outputs from FIG. 1 constellation mapper 104. The N outputs of the N-point DFT unit 226 can be input to a decoder 228. The decoder 228 accordingly can output an m-bit information, with "m" being the number of bits encoded by the constellation position. The parallel-to-serial buffer 230 can serialize the N m-bit information into a recovered information data RI.

Figure 3:
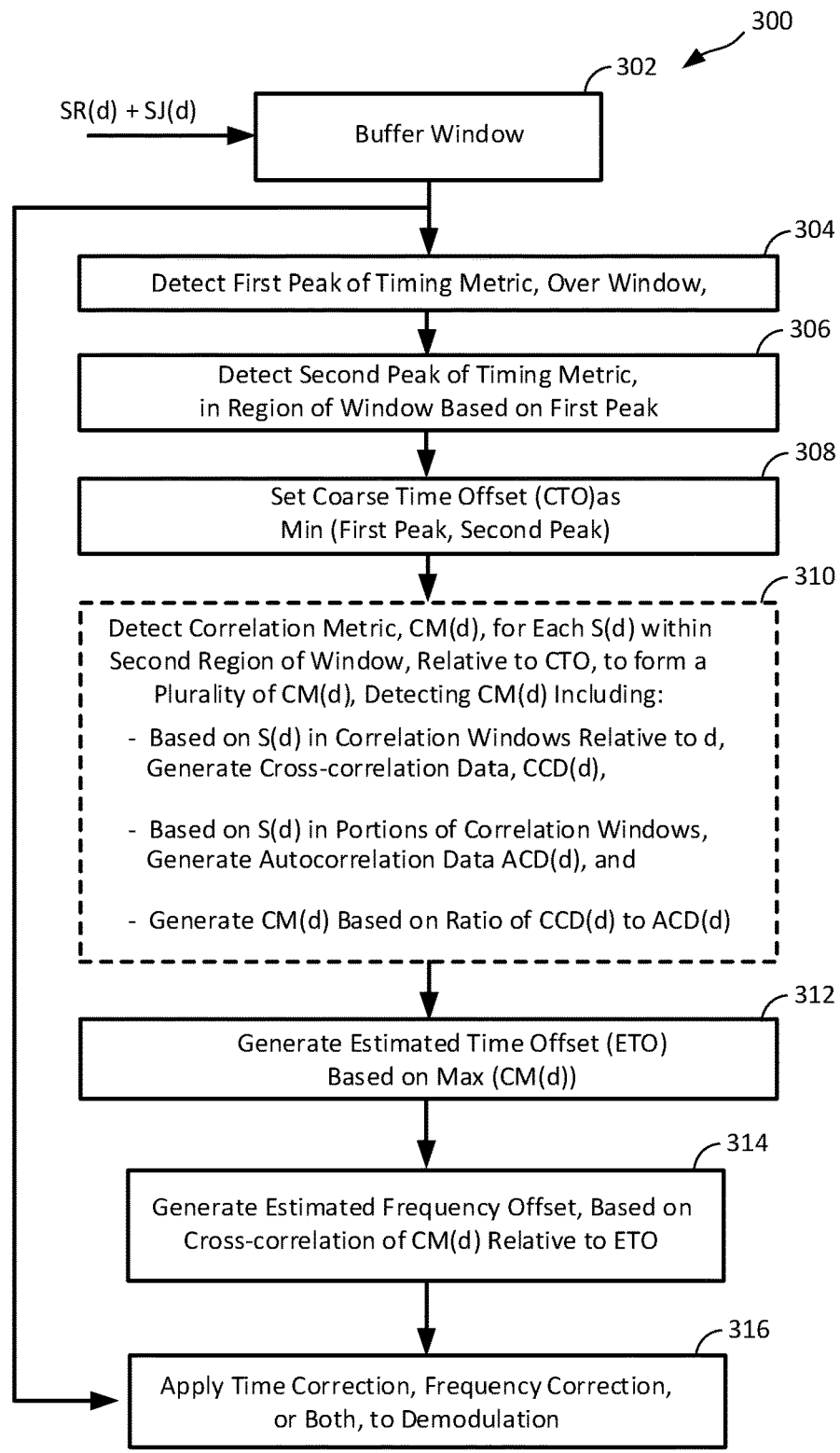
FIG. 3 illustrates a functional block diagram of a flow of operations in a ZFS time and frequency offset estimation process, in a ZFS robust synchronization process.

FIG. 3 illustrates a functional block diagram of a flow 300 of operations in a ZFS time and frequency offset estimation process of an exemplary ZFS robust synchronization. Operations in the flow 300 are described in sequential order. This is not intended as a limitation on the temporal relation of operations. On the contrary, various operations described in reference to different FIG. 3 blocks can be performed concurrent with one another, or fully or partially overlapping in time with one another. It will also be understood that the order of operations in the flow 300 can be re-arranged from the graphical arrangement in which they appear on FIG. 3, and from the order in which they are referenced in the description.

Referring to FIG. 3, the flow 300 can start at 302 with operations of receiving a stream of samples S(d) into a correlation buffer, or equivalent, for purposes of determining particular correlations. One example can be receiving samples S(d) into the FIG. 2 correlation buffer 206, which is capable of holding approximately 2N of the samples, and enabling parallel access for cross-correlation and auto-correlation operations, as described above. The flow 300 can then proceed to 304, and apply operations for detecting a timing metric at each of a succession of the sample indexes d, and determining, as a first peak, an index at which the timing metric is at a local maximum. The timing metric can be, for example, a correlation based timing metric, such as M(d) of Equation (1). Operations at 304 for detecting the timing metric, e.g., M(d), can be performed, for example, by the cross-correlation engine 210 and the autocorrelation engine 212 providing their respective outputs to the timing metric engine 214. Operations at 304 can also include, for example, storing a plurality of the timing metric M(d) values in a peak detection cache or register of a peak detection engine, e.g., the peak detection cache 218, and searching for a local maximum within that cache or register and, upon finding the local maximum, generating its index as a "first peak." The searching and first peak detection operations can be performed, for example, using the FIG. 2 peak detection engine 220.

The flow 300 can then proceed to 306, and apply operations for detecting a second peak of the timing metric within a sub-region, e.g., "first region" of the correlation buffer 206. Such operations can be performed, for example, using the correlation buffer 206, correlation engine 208, timing and correlation metric engine 210, peak detection buffer 216, and peak detection engine 218 as described above for detecting the first peak. Upon detecting the second peak of the timing metric, the flow 300 can proceed to 308 and apply operations of selecting or setting, as a "coarse time estimate" (CTO) of the frame start, the smaller of the index d of the first peak and the index d of the second peak.

Upon setting the coarse time estimate CTO, the flow 300 can proceed to 310 and apply operations of detecting a correlation metric, CM, at each of a plurality of indexes d within a second region of the samples S(d), the second region being based at least in part on the CTO. Operations at 310 can include, for each index d within the second region, generating a cross-correlation data, based at least in part on a correlation window aligned with the index, and generating an autocorrelation data, based at least in part on a region of the correlation window, then determining the CM based at least in part on a ratio of the cross-correlation data to the autocorrelation data. One example of generating a correlation metric at 310 can be according to Equation (6) above.

Associated with operations at 310, the flow 300 can apply operations at 312 of searching for a local maximum in the correlation metric CM and, upon detecting the local maximum can generate the index d of that local maximum as the estimated time offset (ETO).

Referring again to FIG. 3, upon determining the ETO at 312, the flow can proceed to 314 and apply operations of generating an estimated frequency offset (EFF), based at least in part on ETO. The FIG. 2 frequency offset engine 222 can be one example implementation of such operations. Specific operations at 314 can include detecting a cross-correlation of signal samples S(d) within a region of the time indexes aligned with the ETO identified at 312, and generating a corresponding first time offset cross-correlation data. Operations at 314 can also include detecting a cross-correlation of signal samples within a region spaced N time indexes from the region aligned with the ETO, and generating a corresponding second time offset cross-correlation data. Operation at 314 can also include generating, as a cross-correlation sum, a sum of the first time offset cross-correlation data and the second time offset cross-correlation data, and determining the EFF based, at least in part, on a scaling of the cross-correlation sum. One example of determining EFF at 314 can be according to Equation (9) described above.

The flow 300 can proceed from 314 to 316 and apply operations of correcting time offset and frequency offset based, at least in part, on the ETO generated at 312 and the EFF generated at 314.

In applications where the operating SNR is at a low level, an alternative implementation can utilize the FIG. 3 operations for detecting the CTO, and then apply a coherent combination, or accumulation of correlations from ZFS training symbols over multiple frames. Estimated time offset ETO can then be generated, for example, by applying FIG. 3 operations at 312 to the accumulated correlation information, instead of only correlation information from a single frame's ZFS training symbols. Technical features can include an increase in accuracy of the ETO and of the EFF, and corresponding capability of providing acceptable OFDM reception and decoding at lower SNR levels than conventional offset estimation techniques.

Figure 4:
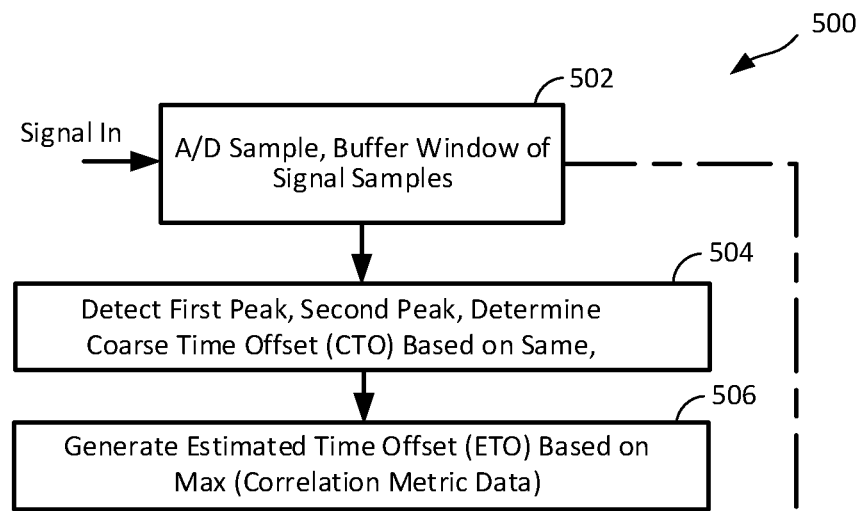
FIG. 4 illustrates a functional flow block diagram of operations in one example process for accumulated ZFS offset estimation, in another ZFS robust synchronization process.

FIG. 4 shows a simplified diagram of a transmission stream 400 that can be used in an accumulated, multi-frame ZFS training symbol correlation, and estimation of time and frequency offset. As shown, there can be a total NF data frames and each data frame can have a ZFS training symbol sequence appended to its beginning.

Figure 5:
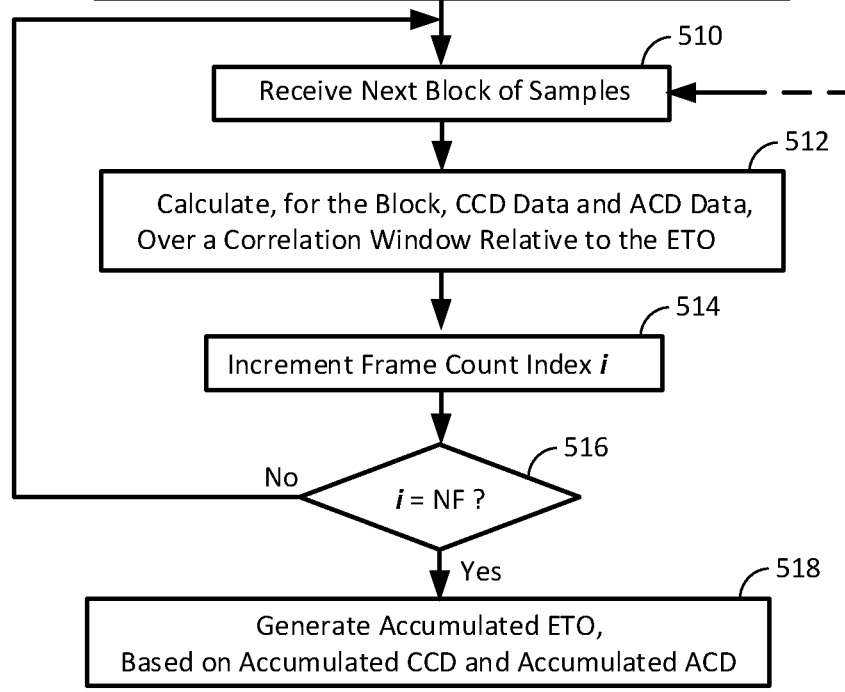
FIG. 5 illustrates a functional block diagram of one example ZFS robust synchronization OFDM receiver with exemplary open loop post-DFT correction.

FIG. 5 illustrates a functional flow block diagram of operations in one example flow 500 for accumulated ZFS offset estimation, in another ZFS robust synchronization process. The flow 500 can incorporate the FIG. 3 operations of detecting the coarse time offset (CTO), and can then apply an accumulating correlation process which, as described above, can improve synchronization accuracy, particularly in low SNR environments.

Referring to FIG. 5, an example instance of the flow 500 will be described starting with an initial detection of the ZFS training symbols. More specifically, the flow 500 can start at 502, with operations of sampling a received signal in. One example of operations at 502 can include the FIG. 2 ADC 202 sampling a quadrature down-converted ZFS OFDM transmission such as described in reference to FIG. 1. The sampling outputs can be, for example, the above-described S(d). Operations at 502 can also include buffering a window of the samples S(d) using, for example, resources such as the FIG. 2 correlation buffer 206. The flow 500 can then proceed to 504, where operations of detecting an approximate frame start can be applied. Such operations can include, for example, the operations applied in the FIG. 3 flow 300 at 304, 306, and 308, namely, detecting a first peak of the timing metric, detecting a second peak, and setting a coarse time offset CTO according to the smaller of the two peaks' respective indexes. The flow 500 can then proceed to 506, where operations such as described in reference to FIG. 3 at 310 and 312 can be applied to generate an initial instance of the estimated time offset ETO. The initial ETO can be based on finding a local maximum of the correlation metric CM, for index positions of S(d) associated with the CTO determined at 504.

Referring to FIG. 5, after generating the initial ETO at 506, the flow 500 can proceed to 508 and initialize an accumulated cross-correlation data (CCD) and an accumulated autocorrelation data, using a correlation window or windows relative to that ETO. Referring to Equation (4) and to FIG. 2, example operations at 508 can include initializing the cross-correlation accumulator 212 with a first iteration of the sum of products numerator of Equation (4) (or of Equation (5) for a non-coherent correlation accumulation), and initializing the autocorrelation accumulator 214 with a first iteration of the sum of products denominator of Equation (4) (or of Equation (5) for a non-coherent correlation accumulation).

After the initializations at 508, the flow 500 can proceed to 510 and receive a next block or window of samples S(d), e.g., from a continuing operation of the sampling at 502, and can then proceed to 512, where operations can be applied to generate another CCD and another ACD, and correspondingly update the running accumulation of each. Operations at 512 can apply the correlation windows used at 508, relative to the newly received window of samples S(d). The flow 500 can then proceed to 514, increment the frame counter index i to i+1, and then proceed to a loop termination test at 516, namely whether the frame counter has reached NF. If the termination condition is not met, the flow 500 can return to 510, receive another window of samples S(d), then repeat the 512 generation of CCD and ACD and updating the accumulated CCD and ACD, and incrementing the frame count at 514, until the frame count i reaches NF. Upon reaching NF, the flow 500 can proceed to 518 and generate an accumulated estimated time offset, based on a ratio of the accumulated CCD to the accumulated ACD. Referring to FIG. 2 and Equation (4) (or Equation (5) for a non-coherent correlation accumulation), such operations can be implemented by shifting successive windows of samples into the correlation buffer 206 and, for each of the windows, applying correlation engine 208 updating the respective cross-correlation accumulator 212 and autocorrelation accumulator 214.

Figure 6:
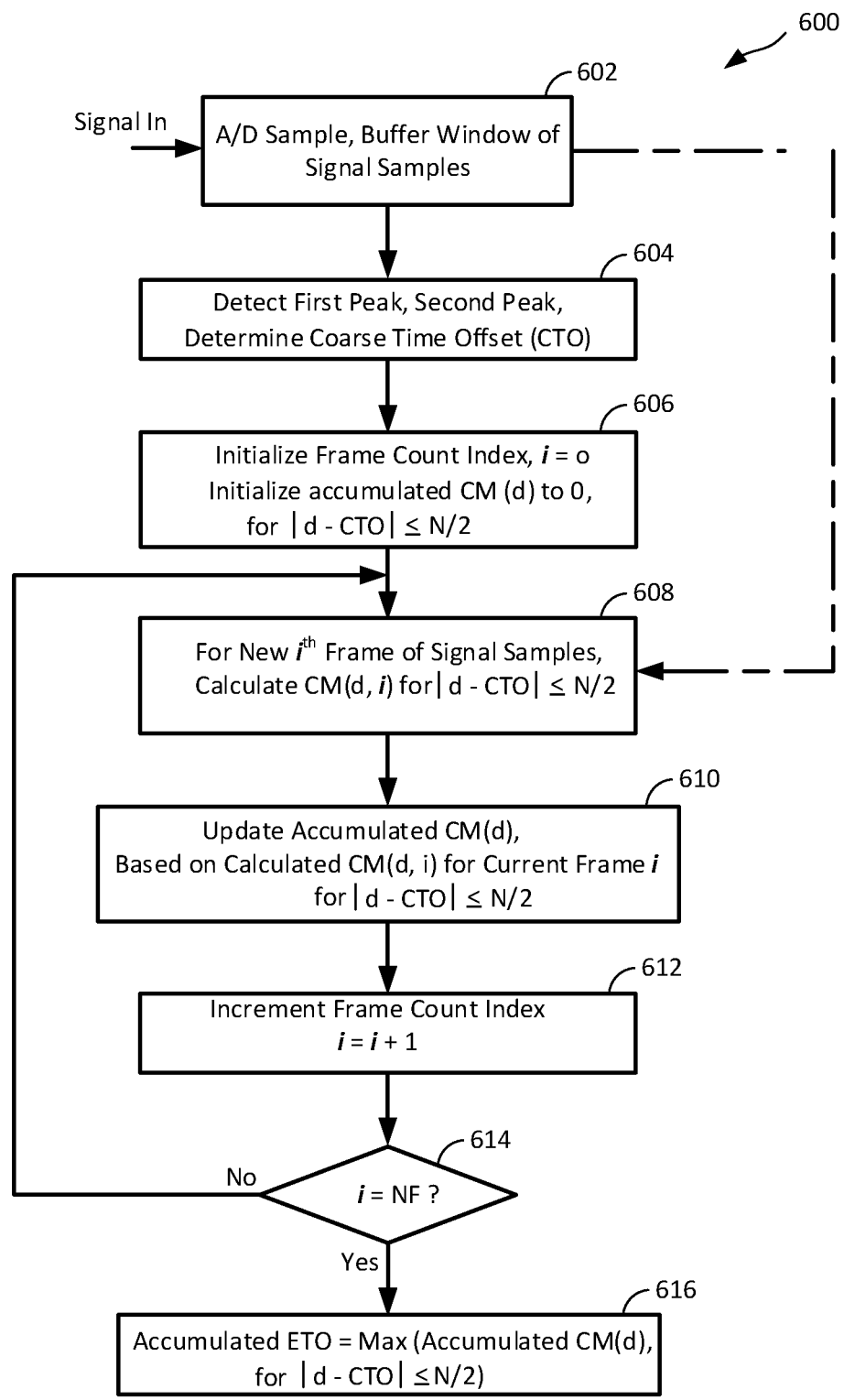
FIG. 6 illustrates a functional flow block diagram of operations in an example flow for accumulated ZFS offset estimation, in another accumulated correlation ZFS robust synchronization process.

FIG. 6 illustrates a functional flow block diagram of operations in an example flow 600 for accumulated ZFS offset estimation, in another accumulated correlation ZFS robust synchronization process. The flow 600 can incorporate the FIG. 3 operations of detecting the CTO). Referring to FIG. 6, an example instance of the flow 600 can start at 602, with operations of sampling a received signal in, for example, the FIG. 2 ADC 202 sampling a quadrature down-converted ZFS OFDM transmission such as described in reference to FIG. 1. Operations at 602 can also include buffering a window of the samples S(d) using, for example, resources such as the FIG. 2 correlation buffer 206. The flow 600 can then proceed to 604, where operations of detecting an approximate frame start can be applied. Such operations can include, for example, the operations applied in the FIG. 3 flow 300 at 304, 306, and 308, namely, detecting a first peak of the timing metric, detecting a second peak, and setting a coarse time offset CTO according to the smaller of the two peaks' respective indexes.

Referring to FIG. 6, after detecting CTO at 604, the flow 600 can proceed to 606 and apply operations of initializing the frame index i to zero, and initializing the Equation (7) accumulated $CM_{coh}(d)$ to zero, or initializing the Equation (8) accumulated $CM_{non}(d)$ to zero, depending on whether coherent or non-coherent accumulation is being applied, for all d in the range relative to N/2 and CTO specified in Equations (7) and (8). After the initialization at 606, the flow 600 can proceed to 608 and receive, e.g., from a continuing operation of the sampling at 602, a next block or window of samples S(d), for the current $i^{th}$ frame, and then calculate a first frame iteration, applying either Equation (7) or (8), for all d in the specified range. The flow 600 can then proceed to 610 and update the accumulated CM(d), over the range of d relative to N/2 and CTO, using the $i^{th}$ frame CM(d) calculated at 608. Upon updating the accumulated CM(d) at 610, the flow 600 can proceed to 612, increment the frame index i by one, and then proceed to the frame count loop escape at 614. In the FIG. 6 illustrated implementation, the frame index i is incremented after an iteration of 608 and 610, and therefore the loop escape can be set at i=NF+1.

Referring to FIG. 6, and to Equations (7) and (8), when the above-described block 614 escape condition is met, the summation is complete for whichever of Equations (7) and (8) is applied, and the result is a plurality of accumulated correlation metrics CM(d)—one for each d in the defined range relative to COT and N/2—each of the metrics being a coherently or non-coherently combined correlation over NF frames. The flow 600 can then proceed to 616 and determine, as the accumulated ETO, the maximum of the accumulated correlation metrics CM(d), applying Equation (10) if a coherent accumulation is selected and applying Equation (11) if a non-coherent accumulation is selected.

Figure 7:
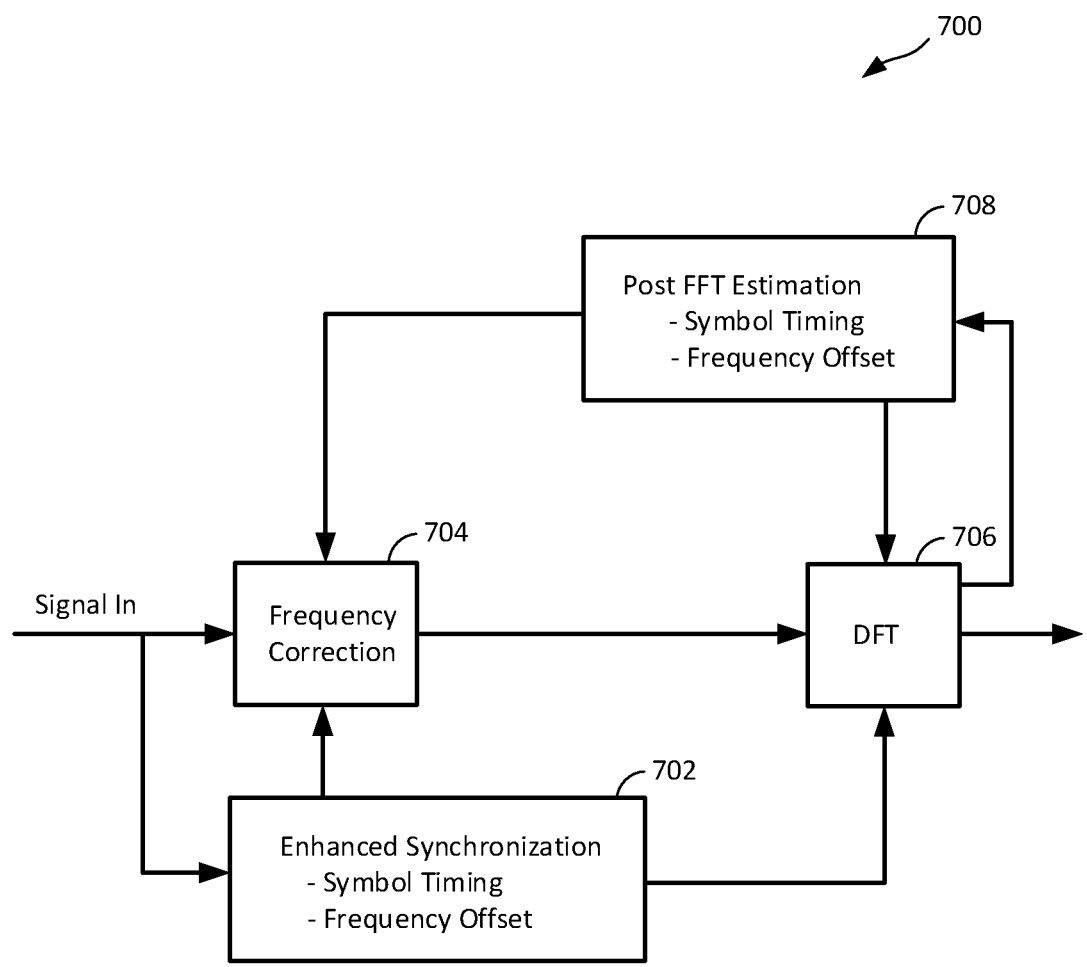
FIG. 7 illustrates a functional block diagram of one example enhanced ZFS robust synchronization OFDM receiver.

FIG. 7 illustrates a functional block diagram of one example enhanced ZFS robust synchronization OFDM receiver 700 (abbreviated for brevity as "the receiver 700") with open loop post-DFT correction, and other features. The illustrated receiver 700 can include an enhanced ZFS/robust synchronization OFDM receiver 702, which can include the FIG. 2 ZFS/robust synchronization OFDM receiver system 200, configured to apply coherent combination, or accumulation of correlations from ZFS training symbols over multiple frames, such as described above in reference to Equations (7) and (8). The receiver 700 can include a frequency correction unit 704, DFT unit 706 and a post DFT estimation unit 708. In an example operation, after time-domain synchronization, for example applying the FIG. 3 flow 300, by single-frame operation of the enhanced ZFS/robust synchronization OFDM receiver 702 the received training symbols are frequency corrected by the frequency correction unit 704, and then demodulated using the DFT 706. The demodulated symbols (in the frequency domain) can then be correlated, by the post DFT estimation unit 708, with known frequency domain training symbols, to generate an OFDM symbol timing estimate.

Operations associated with the post DFT estimation unit 708 can include coherent time-domain combining N correlated values within each OFDM symbol and non-coherent time-domain combining over NS (e.g., two or more) OFDM training symbols in each training sequence and, additionally, accumulating over NF frames (e.g., as described in reference to Equations (7) and (8)). The receiver 700 can be configured to apply a peak searching algorithm to the correlated data to generate an enhanced accuracy estimate of OFDM symbol timing. The receiver 700 can be configured to use that timing estimate to correct any remaining timing offset, and frequency domain training symbols can be recalculated based on the updated estimate of the start of FFT window. For the carrier frequency offset estimator, the receiver 700 can determine correlations between two adjacent OFDM training symbols, and can then compute final frequency offset estimate, based on the coherently combined correlations. In an implementation, the receiver 700 can be configured to apply a maximum likelihood estimator (MLE) to estimate the frequency offset. Example operations can include taking the DFT of the correlated frequency domain training symbols, interpolation, and peak searching.

Figure 8:
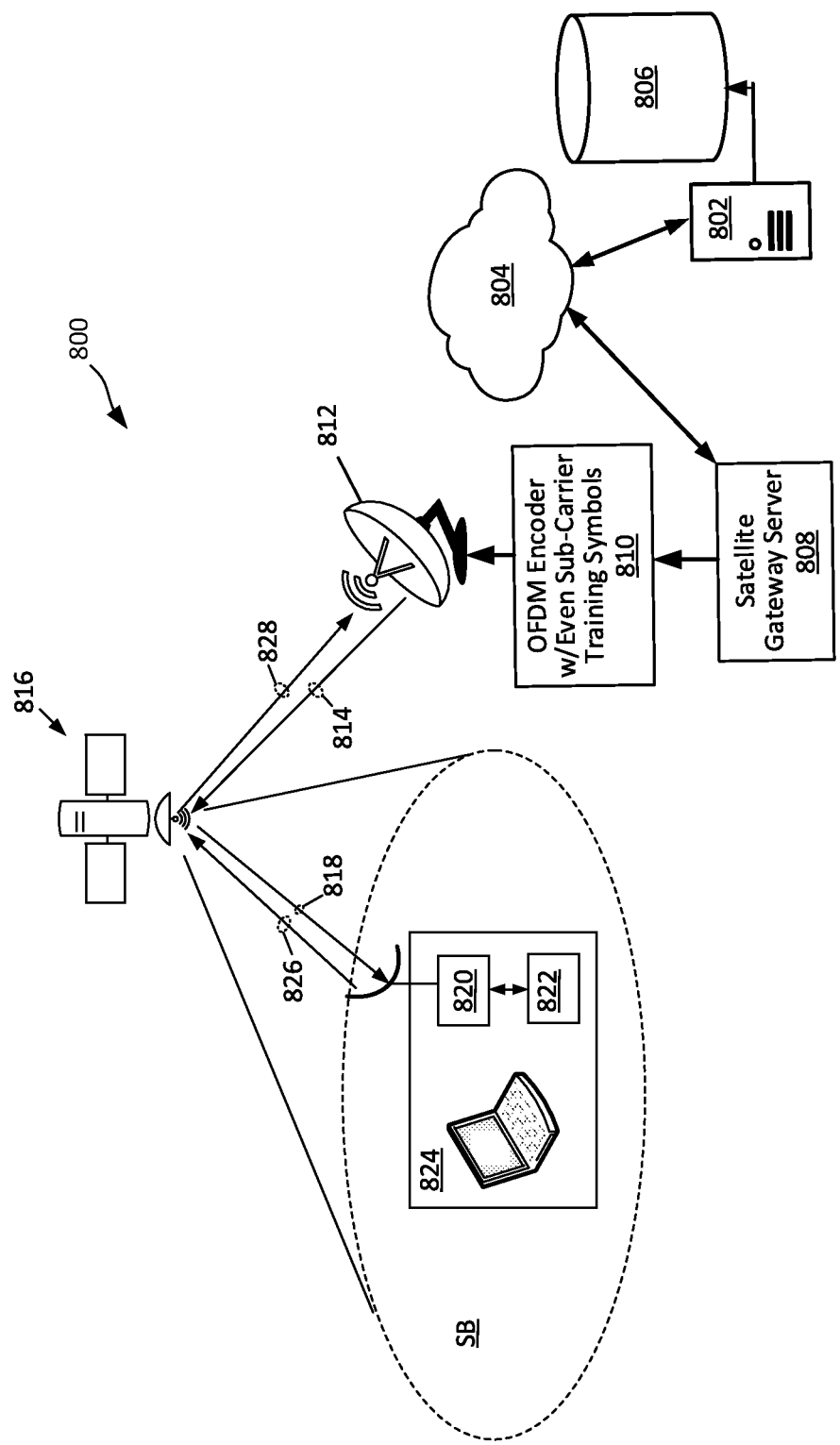
FIG. 8 illustrates a simplified functional block diagram of one example ZFS robust synchronization OFDM satellite communication system.

FIG. 8 illustrates a simplified functional block diagram of an example ZFS OFDM satellite communication system 800 in which various methods and systems for ZFS OFDM transmission and robust ZFS OFDM synchronization, and aspects thereof, can be implemented. The ZFS OFDM satellite communication system 800 can include a content host server 802 configured to interface to a wide area network (WAN) 804, e.g., the Internet, for functions that can include transmitting content, for example from a content storage 806, through the WAN 804, to a satellite gateway server 808. The satellite gateway server 808 can perform satellite uplink protocol operations and provide a resulting satellite protocol compliant packet stream to the ZFS OFDM satellite uplink transmission unit 810. An example implementation of the ZFS OFDM satellite uplink transmission unit can include the FIG. 1 system 100, with the packet stream output of the FIG. 8 satellite gateway server 808 being the "data in" of FIG. 1. The ZFS OFDM satellite uplink transmission unit 810 can output, for example, through a transmission dish 812, a corresponding ZFS OFDM satellite uplink signal 814 to a satellite 816. The satellite 816 can be, for example, a space-borne High Throughput Satellite (HTS) configured to transmit data to a plurality of narrowly focused regional spot beams. The satellite 816 can in turn, in a bent-pipe satellite communication configuration, transmit a corresponding ZFS OFDM satellite downlink signal 818 to a plurality of narrowly focused regional spot beams. A portion of one of the spot beams, labeled "SB," is visible in FIG. 8. A VSAT terminal receiver (or transceiver) 820 can be located in the spot beam SB, and can include a VSAT ZFS robust synchronized receiver 822 that can be configured, for example, according to the FIG. 2 ZFS robust synchronized receiver 200. The VSAT ZFS robust synchronized receiver 822 can connect, for example, to a WiFi station (not visible in FIG. 8) for wireless link to a laptop 824 or equivalent user device. The VSAT terminal receiver can be configured to provide an uplink 826, e.g., a control uplink, to the satellite 816, for communication as a downlink 828 to the satellite gateway server 808.

In some implementations, more than one satellite may be used, or other types of satellites may be used, including, but not limited to, Fixed Satellite Service (FSS) High Throughput Satellite (HTS). In some implementations, satellite 816 can be configured to receive data from one or more gateway stations for retransmission via spot beams to remote sites located within cells defined by the spot beams.

In one various supplemental or alternative implementations, an elevated platform other than a satellite can be used to receive a logical equivalent to the OFDM satellite uplink signal 814 and transmit, to a ZFS robust synchronization OFDM receiver implemented as other than a VSAT, a logical equivalent to the ZFS OFDM satellite downlink signal 818. Examples of an elevated platform can include, and are not limited to, a balloon, airship, or unmanned aircraft vehicle (UAV), supporting transponder equipment such as provided in an HTS.

Figure 9:
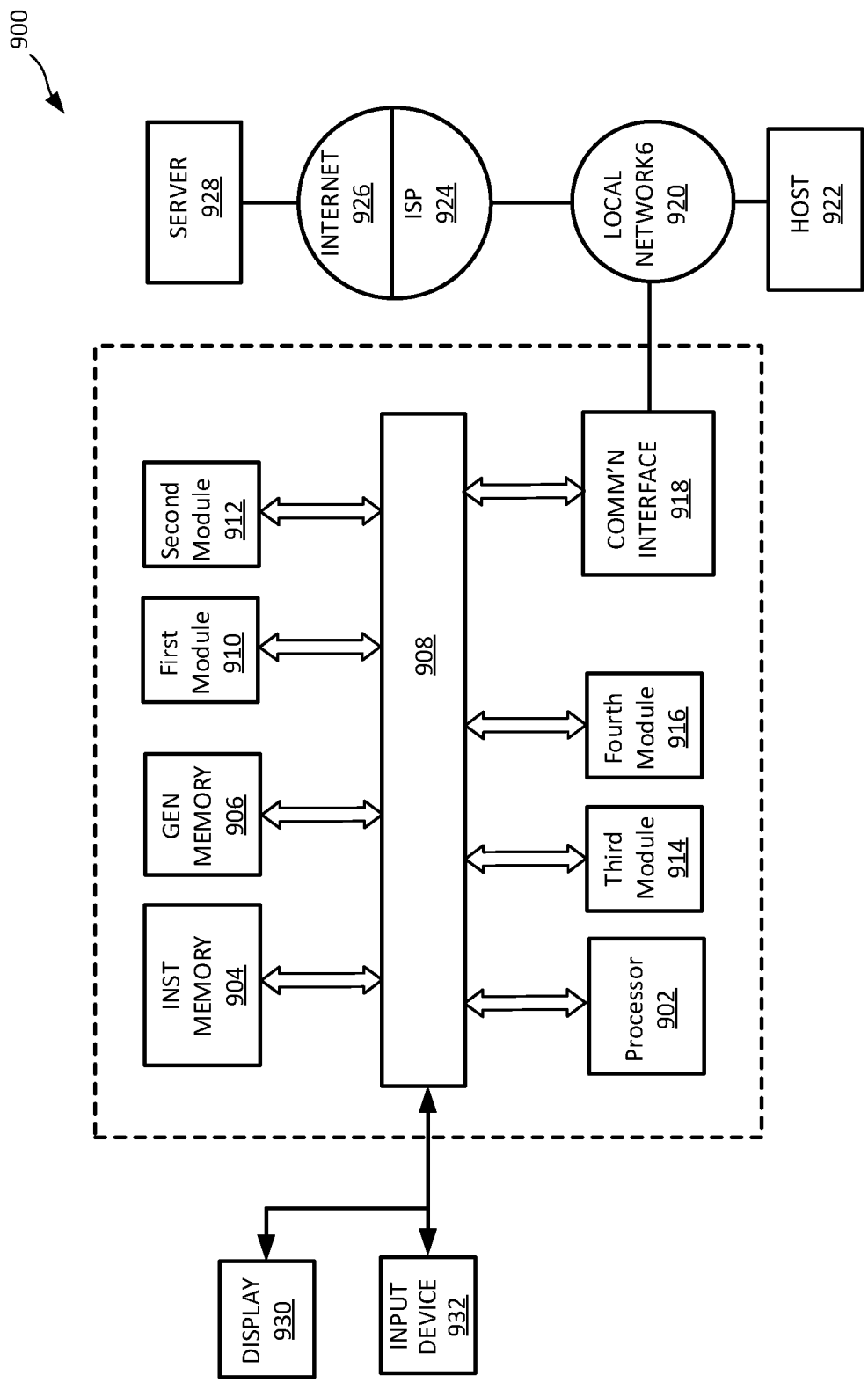
FIG. 9 illustrates a functional block diagram of an example computer system upon which aspects of this disclosure may be implemented.

FIG. 9 is a block diagram illustrating a computer system 900 upon which aspects of this disclosure may be implemented, such as, but not limited to, particular logic blocks and specific engines described in reference to FIG. 2, and processes described at FIGS. 3, 4, 5, and 6. It will be understood that logic blocks illustrated in FIG. 9 represent functions, and do not necessarily correspond to particular hardware on a one-to-one basis.

Referring to FIG. 9, the computer system 900 can include a data processor 902, instruction memory 904, and a general purpose memory 906, coupled by a bus 908.

The instruction memory 906 can include a tangible medium retrievably storing computer-readable instructions, labeled as "first module" 910, that when executed by the data processor 902 cause the processor to perform operations, such as described for the FIG. 2 correlation engine 208, and computer-readable instructions, labeled as "second module" 912, that when executed by the data processor 902 cause the processor to perform operations, such as described for the FIG. 2 timing and correlation metric engine 210. The instruction memory 906 can store, on the tangible medium, computer-readable instructions, labeled as "third module" 914 and "fourth module" 916, that when executed by the data processor 902 cause the processor to perform operations such as described for the FIG. 2 ETO engine 220, and frequency offset engine 222, respectively.

The computer system 900 can also include a communications interface 918, configured to interface with a local network 920 for accessing a local server 922, and to communicate through an Internet service provider (ISP) 924 to the Internet 926, and access a remote server 928. The computer system 900 can also include a display 930 and a user interface 932, such as a touchscreen or keypad.

The term "machine-readable medium" as used herein refers to any medium that participates in providing data that causes a machine to operation in a specific fashion. Forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracing of such subject matter is hereby disclaimed.

Except as stated immediately above, nothing stated or illustrated herein is intended or should be interpreted to cause a dedication of any component, step, feature, object, benefit, advantage, or equivalent to the public, regardless of whether it is or is not recited in the claims.

It will be understood that terms and expressions used herein have the ordinary meaning accorded to such terms and expressions in their respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, or apparatus comprising the element.

The Abstract of the Disclosure is provided to allow the reader to quickly identify aspects of the disclosed subject matter. In the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A system for synchronizing a receiving of an orthogonal frequency division multiplexing (OFDM), the system comprising:
   an input data interface configured to receive a sequence signal samples and associated indexes;
   a processing unit; and
   a memory configured to a store a plurality of instructions that when read and executed by the processing unit cause the processing unit to:
      detect a timing metric at each of a succession of the indexes and determine, as a first peak, an index at which the timing metric is at a local maximum,
      detect the timing metric at indexes within a first region of the indexes and determine, as a second peak, an index at which the timing metric is at another local maximum, the first region being based in part on the first peak,
      select a coarse offset as the smaller of the first peak and the second peak,
      detect a correlation metric at each of a plurality of indexes within a second region of the indexes, the second region being based at least in part on the coarse offset,
      generate, as an estimated time offset, an index at which the detected correlation metric is at a local maximum, and
      apply a synchronization correction to a recovery of symbols from the signal samples, based at least in part on the estimated time offset.

2. The system of claim 1, wherein the input data interface is configured to receive the sequence signal samples and associated indexes for each frame among a succession of frames, and
   wherein to detect the correlation metric at each of the plurality of indexes within the second region of the indexes includes, for each index, includes to:
      calculate a single-frame correlation metric for each frame among multiple frames with the succession of frames, to form multiple single-frame correlation metrics for the index, and
      combine the multiple single frame correlation metrics for the index into an accumulated correlation metric, and
      detect the correlation metric for the index as the accumulated correlation metric.

3. The system of claim 2, wherein to combine the multiple single frame correlation metrics for the index into the accumulated correlation metric includes to:
   select, as a selected combining, between a coherent combining and a non-coherent combining, and
   apply the selected combining.

4. The system of claim 1, wherein the synchronization correction is a time correction and is based, at least in part, on the estimated time offset.

5. The system of claim 1, wherein to detect the correlation metric includes to:
   generate a cross-correlation data, based at least in part on a correlation window aligned with the index at which the correlation metric is at a local maximum,
   generate an autocorrelation data, based at least in part on a region of the correlation window, and
   determine the correlation metric, based at least in part on a ratio of the cross-correlation data to the autocorrelation data.

6. The system of claim 1, wherein the instructions further include instructions that when read and executed by the processing unit cause the processing unit to:
   generate an estimated frequency offset, based at least in part on the estimated time offset, wherein:
   the synchronization correction is a frequency correction and is based, at least in part, on the estimated frequency offset.

7. The system of claim 6, wherein:
   the sequence of signal samples includes a window of integer N signal samples, aligned with a corresponding N time indexes, and
   to generate the estimated frequency offset includes to:
      detect a cross-correlation of signal samples within a region of the time indexes aligned with the estimated time offset and generate a corresponding first time offset cross-correlation data,
      detect a cross-correlation of signal samples within a region spaced N time indexes from the region aligned with the estimated time offset, and generate a corresponding second time offset cross-correlation data,
      generate, as a cross-correlation sum, a sum of the first time offset cross-correlation data and the second time offset cross-correlation data, and
      determine the estimated frequency offset based, at least in part, on a scaling of the cross-correlation sum.

8. The system of claim 6, wherein to apply the frequency correction includes to output, as a result, a frequency corrected signal sample stream, and wherein the instructions further include instructions that when read and executed by the processing unit cause the processing unit to:
   apply a frequency domain demodulation to the frequency corrected signal sample stream and output a corresponding recovered frequency domain symbol stream;
   determine a correlation between the recovered frequency domain symbol stream and a plurality of pre-stored frequency domain training symbols, and output a corresponding training symbol correlation data;
   estimate a fine frequency offset, based at least in part on the training symbol correlation data; and
   adjust the frequency correction, based at least in part on the estimated fine frequency offset.

9. The system of claim 8, wherein to estimate the fine frequency offset includes to:
  generate a discrete Fourier transform of the training symbol correlation data,
  apply a Maximum Likelihood Estimation to the generated discrete Fourier transform based at least in part on the training symbol correlation data, and
  generate the estimated fine frequency offset based, at least in part, on a result of the Maximum Likelihood Estimation.

10. A method for synchronizing a receiving of an orthogonal frequency division multiplexing (OFDM) communication, comprising:
  receiving a sequence of signal samples and associated indexes;
  detecting a timing metric at each of a succession of the indexes and determining, as a first peak, an index at which the timing metric is at a local maximum;
  detecting the timing metric at indexes within a first region of the indexes and determining, as a second peak, an index at which the timing metric is at another local maximum, the first region being based in part on the first peak;
  selecting a coarse offset as the smaller of the first peak and the second peak;
  detecting a correlation metric at a plurality of indexes within a second region of the indexes, the second region being based at least in part on the coarse offset;
  determining, as an estimated time offset, an index at which the correlation metric is a local maximum; and
  applying a synchronization correction to a recovery of symbols from the signal samples, based at least in part on the estimated time offset.

11. The method of claim 10, wherein the synchronization correction is a time correction and is based, at least in part, on the estimated time offset.

12. The method of claim 10, the method further comprising:
  generating an estimated frequency offset, based at least in part on the estimated time offset, wherein:
  wherein the synchronization correction is a frequency correction, and the frequency correct is based, at least in part, on the estimated frequency offset.

13. The method of claim 12, wherein:
  the sequence of signal samples includes a window of integer N signal samples, aligned with a corresponding N time indexes, and
  generating the estimated frequency offset includes:
    detecting a cross-correlation of signal samples within a region of the time indexes aligned with the estimated time offset and generating a corresponding first time offset cross-correlation data,
    detecting a cross-correlation of signal samples within a region spaced N time indexes from the region aligned with the estimated time offset, and generating a corresponding second time offset cross-correlation data,
    generating, as a cross-correlation sum, a sum of the first time offset cross-correlation data and the second time offset cross-correlation data, and
    determining the estimated frequency offset based, at least in part, on a scaling of the cross-correlation sum.

14. The method of claim 12, wherein applying the frequency correction includes applying the frequency correction to the signal samples and outputting, as a result, a frequency corrected signal sample stream, and wherein the method further comprises:
  applying a frequency domain demodulation to the frequency corrected signal sample stream and outputting a corresponding recovered frequency domain symbol stream;
  determining a correlation between the recovered frequency domain symbol stream and a plurality of pre-stored frequency domain training symbols, and outputting a corresponding training symbol correlation data;
  estimating a fine frequency offset, based at least in part on the training symbol correlation data; and
  adjusting the frequency correction, based at least in part on the estimated fine frequency offset.

15. The method of claim 14, wherein:
estimating the fine frequency offset includes:
  generating a discrete Fourier transform of the training symbol correlation data,
  applying a Maximum Likelihood Estimation to the generated discrete Fourier transform based at least in part on the training symbol correlation data, and
  generating the estimated fine frequency offset based, at least in part, on a result of the Maximum Likelihood Estimation.

\* \* \* \* \*